(12) United States Patent
Reinhardt (10) Patent No.: US 9,817,367 B2
(45) Date of Patent: Nov. 14, 2017

(54) METHOD AND DEVICE FOR VERIFYING DIFFRACTIVE ELEMENTS

(71) Applicant: U-NICA Technology AG, Malans (CH)

(72) Inventor: Jonas Reinhardt, Bad Ragaz (CH)

(73) Assignee: U-NICA Technology AG, Malans (CH)

( * ) Notice: Subject to any disclaimer, the term of this patent is extended or adjusted under 35 U.S.C. 154(b) by 10 days.

(21) Appl. No.: 14/903,460

(22) PCT Filed: Jul. 7, 2014

(86) PCT No.: PCT/EP2014/064447
§ 371 (c)(1),
(2) Date: Jan. 7, 2016

(87) PCT Pub. No.: WO2015/010881
PCT Pub. Date: Jan. 29, 2015

(65) Prior Publication Data
US 2016/0378061 A1    Dec. 29, 2016

(30) Foreign Application Priority Data
Jul. 25, 2013  (CH) ...................... 1308/13

(51) Int. Cl.
*G06K 9/00*    (2006.01)
*G03H 1/00*    (2006.01)
(Continued)

(52) U.S. Cl.
CPC .......... *G03H 1/0011* (2013.01); *G03H 1/265* (2013.01); *G06K 9/209* (2013.01); *G06K 9/22* (2013.01);
(Continued)

(58) Field of Classification Search
CPC ........ G03H 1/0011; G03H 1/265; G06K 9/22; G06K 9/209; A61B 2560/0233; A61B 5/0075; A61B 5/0077; A61B 5/1455
See application file for complete search history.

(56) References Cited

U.S. PATENT DOCUMENTS 5,986,781 A * 11/1999 Long ...................... G03H 1/041
                                                          349/201
6,122,042 A *  9/2000 Wunderman ............ A61B 1/05
                                                          356/343
(Continued)

FOREIGN PATENT DOCUMENTS

EP     0 880 112 A2    11/1998
EP     2 290 620 A1     3/2011
(Continued)

OTHER PUBLICATIONS

Qingxuan Yang, "Inertial Sensors Aided Image Alignment and Stitching for Panorama on Mobile Phones", Proceedings of the 1st International Workshop on Mobile Location-Based Service, MLBS '11, Jan. 1, 2011 (Jan. 1, 2011), pp. 21-29, XP055134004.
(Continued)

*Primary Examiner* — Ali Bayat
(74) *Attorney, Agent, or Firm* — Sughrue Mion, PLLC (57) ABSTRACT

The invention relates to a method for authenticating a diffractive element, e.g., a hologram, on an object or document (2), wherein at least two images of the diffractive element are recorded by means of a portable device (1). The recordings are taken in different spatial orientations of the portable device in relation to the diffractive element. Recording data are created from the images and the associated spatial orientations. The recording data are electronically compared with reference data. The comparison can be performed locally or in a server-based manner.

27 Claims, 4 Drawing Sheets

(51) Int. Cl.
  *G03H 1/26* (2006.01)
  *G06K 9/22* (2006.01)
  *G07D 7/121* (2016.01)
  *H04W 4/00* (2009.01)
  *G06K 9/20* (2006.01)
  *G03H 1/22* (2006.01)
  *H04W 4/02* (2009.01)

(52) U.S. Cl.
  CPC ............ *G07D 7/121* (2013.01); *H04W 4/001* (2013.01); *G03H 2001/2244* (2013.01); *G03H 2001/2247* (2013.01); *G03H 2001/2281* (2013.01); *G03H 2210/33* (2013.01); *G06K 2009/0059* (2013.01); *H04M 2250/10* (2013.01); *H04M 2250/12* (2013.01); *H04M 2250/52* (2013.01); *H04W 4/008* (2013.01); *H04W 4/02* (2013.01)

(56) References Cited

U.S. PATENT DOCUMENTS

| | | | |
|---|---|---|---|
| 6,222,650 B1* | 4/2001 | Long | G03H 1/041 283/86 |
| 6,832,003 B2 | 12/2004 | McGrew | |
| 6,925,403 B2* | 8/2005 | Nowak | G06K 9/209 702/94 |
| 2007/0121186 A1 | 5/2007 | Kitamura et al. | |
| 2009/0154813 A1 | 6/2009 | Baxter et al. | |
| 2009/0316012 A1* | 12/2009 | Matos | H04N 1/00323 348/208.14 |
| 2011/0292277 A1 | 12/2011 | Cheng | |
| 2012/0176655 A1 | 7/2012 | Shirakura | |
| 2013/0044257 A1 | 2/2013 | Chien et al. | |
| 2013/0158947 A1* | 6/2013 | Suzuki | G01B 11/00 702/155 |

FOREIGN PATENT DOCUMENTS

| | | |
|---|---|---|
| EP | 2 607 953 A1 | 6/2013 |
| WO | 92/09444 A1 | 6/1992 |

OTHER PUBLICATIONS

International Search Report for PCT/EP2014/064447 dated Aug. 22, 2014 [PCT/ISA/210].

International Preliminary Report on Patentability issued from the International Bureau in counterpart International Application No. PCT/EP2014/064447, dated Feb. 4, 2016.

* cited by examiner

METHOD AND DEVICE FOR VERIFYING DIFFRACTIVE ELEMENTS

CROSS REFERENCE TO RELATED APPLICATIONS

This application is a National Stage of International Application No. PCT/EP2014/064447, filed on Jul. 7, 2014, which claims priority from Swiss Patent Application No. 01308/13, filed on Jul. 25, 2013, the contents of all of which are incorporated herein by reference in their entirety.

TECHNICAL FIELD

The present invention relates to a method and to an apparatus for authenticating objects and documents using diffractive elements such as holograms or holographic kinegrams.

PRIOR ART

Marking objects with holograms or hologram-like elements is commonplace. Holograms and hologram-like elements are characterized by the fact that they contain diffractive structures which, upon illumination with visible light, result in perceivable optical diffraction and interference under transmitted or reflected light, similar to a diffraction grating. A hologram is a two-dimensional image of an object, produced by holographic techniques, which, upon illumination with suitable light, produces a three-dimensional image of the original object due to interference. In mathematical terms, the object is reconstructed in a hologram from its Fourier transform.

Hologram-like elements in the following text are elements having diffractive structures which, upon illumination with visible light, produce visually perceivable diffraction and interference phenomena, but which do not necessarily produce a three-dimensional image of an original object. A hologram-like element can be, for example, a stereogram or a computer-generated graphic with light diffracting primitives such as for example a Kinegram™ (as was developed for example by OVD Kinegram AG), which, upon viewing from different spatial directions, shows different images, wherein the different images can give, for example, the appearance of a movement sequence. The term "diffractive element" is used in the following as a generic term for holograms and hologram-like elements having diffractive structures.

Visual markings with diffractive elements have a high recognition value and are carried out for example for reasons of esthetics, as proof of origin, to improve anti-forgery security, for indicating a use by date, but also for other reasons. Such diffractive elements are often placed on labels. However, print applications or injection molding methods have become known with which diffractive elements can be produced directly on objects. The diffractive elements in the stated applications are generally assessed with the naked eye. Texts and symbols which are introduced in the diffractive element, for example an indication such as "genuine" or a company logo, can here serve as auxiliary information to confirm the authenticity of a product, for example.

It is obvious here that this type of verification is only of a qualitative and subjective nature and, by the untrained eye and without possibilities for comparison with an original pattern, can even be counterproductive, since in these cases even a poor copy of a diffractive element can easily imitate the originality or genuineness of the object or of the document. A diffractive element can be constructed, for example, such that a trademark is readable only from a specific image angle. For a human observer, this authenticity criterion is fulfilled if, upon wiggling the hologram, the trademark appears or disappears momentarily. However, this is not sufficient for a reliable authentication. In addition, machine-readable data, which are integrated in the diffractive element, cannot be recognized, let alone be read or otherwise evaluated with the eye alone.

Therefore, an objective and quantitatively usable method is desired to be able to recognize and read diffractive elements such as holograms. Since in practice there is little sense in evaluating the diffractive elements in a laboratory, but rather an authentication should be able to be carried out by anyone, i.e. by users who are untrained, an efficient apparatus-supported evaluation should occur more or less automatically, should be preferably intuitively operated and be implementable on mobile, preferably also cost-effective and easily available devices.

The prior art already discloses methods for machine evaluation of holograms. EP-A-0880112, for example, discloses a method in which a reconstruction beam, a diffraction beam of 0-th order from the hologram and two associated reference beams are used to verify the hologram on the object of interest. The suggested method is relatively complicated and requires a verification apparatus which is constructed specifically for this purpose. Operation by untrained personnel is also hard to imagine. Further methods for reading a hologram were disclosed for example in US-A-2012/176655, US-A-2007/121186 or U.S. Pat. No. 6,832,003. These methods also require complicated verification apparatuses which are constructed specifically for the evaluation of holograms and are not generally available.

Another approach for authenticating a hologram was proposed by InkSure Technologies, Inc., under the name Smartsure™ Here, a mobile telephone is used to acquire an image of a hologram. The method presupposes that the hologram to be verified contains what are known as "taggants." These are special pigments applied on the hologram. The authentication thus does not take place primarily via the holographic (diffractive) properties of the hologram, but by way of special features which were additionally associated with the hologram.

WO-A-2011/045543 describes a method in which the appearance of a hologram is simulated and displayed on a display of a mobile device. Depending on the orientation of the device, another view of the hologram is shown. The user compares the simulated image with the image of the corresponding genuine hologram under the same observation angle. The comparison, however, is done only visually by the eye of the user and is therefore dependent on the subjective perception of the user. In addition, only features which are perceivable with the naked eye are recognizable and distinguishable.

SUMMARY OF THE INVENTION

The invention makes available a method for authenticating a diffractive element, which can be carried out semi-automatically or fully automatically and requires no subjective comparison. The method can also be carried out by untrained users. It is suitable also for authenticating diffractive elements having features which are not recognizable or recognizable only with difficulty with the naked eye, for example microstructures such as micro lettering, or which are distinguishable from one another only with great difficulty, for example pseudorandom patterns ("fingerprints").

The method acquires the diffractive properties of the diffractive element and is not dependent on further marking means. The method is carried out using a portable device which has an image recording apparatus. Such devices are generally available, for example in the form of a mobile telephone, as a result of which no special costly devices that are not readily available or special complex structures for authentication are necessary.

The method comprises the following features:

recording at least two images of the diffractive element using the portable device, wherein the images are recorded with different spatial orientations of the portable device relative to the diffractive element (to this end, the portable device and/or the diffractive element can be moved in space);

determining the spatial orientations of the portable device during the recording of the images with respect to at least two spatial directions;

generating recording data from the images and the associated spatial orientations; and electronically comparing the recording data with reference data.

Thus, at least two, preferably three or more, images of the diffractive element are recorded from different directions. This can be done in the form of individually triggered photographs with a conventional camera function, or it is possible to record a video sequence with a multiplicity of successive images, while the portable device and the diffractive element are tilted relative to one another. The recording data can, in the simplest case, be data structures in which the image data and orientation data are combined in a suitable form. The reference data can in this case be calculated from available data for a known diffractive element (reference element) by calculating (simulating) images of the reference element in the given spatial orientations. The image comparison can then take place with known digital image processing algorithms. It is, however, also conceivable to derive recording data which are derived in a more complex manner from image data and orientation data, for example using lossless or lossy compression algorithms, pattern recognition algorithms and/or using hash functions etc. It is possible in this way to significantly reduce the data amount before the comparison and to simplify the electronic comparison.

It is also possible to record two or more images under different illumination conditions, for example once in natural ambient light and once using an illumination function of the portable device. The illumination function can, for example, be realized by way of a light source that is integrated in the portable device, such as for example an integrated electronic flash or an integrated LED, or by way of an external light source that is connected to the portable device. It is also conceivable to record images at different illumination intensities of the illumination function of the portable device. It is advantageous here if at least two images with different illumination conditions are recorded from substantially the same direction so that the influence of the different illumination conditions is directly determinable. For example, it is conceivable to take a first image without a flash and directly thereafter a second image with a flash, or vice versa. In a further variant, the portable device has a separate illumination module that produces a targeted special illumination, for example with directional light, as is produced by a laser diode. It is also possible to record images with different distances between the diffractive element and the portable device.

In order to be able to resolve even small details of the diffractive element, the image recording apparatus can have a macro-objective and/or an optical zoom objective. It is also conceivable to provide a separate magnification module, which is in the form of an add-on module for the image recording apparatus and has a lens arrangement which increases the magnification (for example by increasing the focal length of the objective). This is advantageous in particular if in the method a diffractive element is to be authenticated that has structures which cannot be recognized with the naked eye, such as micro lettering or random patterns. A magnification module and an illumination module can be combined in one unit. This can be configured as an add-on module or the like, which is releasably connectable to the portable device. The spatial orientations are determined preferably with the aid of sensors that are integrated in the portable device. These are for example one or more inertial sensors (linear acceleration sensors), one or more gyroscopes (rotary acceleration sensors) and/or one or more magnetometers. Such sensors are referred to in the following for simplification generally as orientation sensors. The sensors generally determine at least one spatial orientation relative to a fixed reference system, for example relative to the direction of gravity (z-direction) using inertial sensors and, if appropriate, relative to magnetic North using a magnetometer. Changes in the orientation can be detected in addition by the use of gyrosensors (electronic gyroscopes). So as to be able to determine a spatial orientation of the portable device relative to the diffractive element, it is possible to use different methods. It is thus possible, for example, to initially perform a reference measurement in a prescribed, known reference orientation relative to the diffractive element, and following orientations are in relation to this reference orientation.

Alternatively or additionally, the orientation of the portable device relative to the diffractive element can be determined directly from the recorded images. This is possible for example if the diffractive element has a suitable and previously known outline shape and/or is provided with suitable markings. For example, the diffractive element can have a rectangular outline and have a marking in one corner that indicates where "top left" is, or it can have for example an asymmetric outline shape which makes it directly possible to uniquely determine the orientation of the diffractive element. It is possible in this way to determine, from one image of the diffractive element, the orientation of the image recording apparatus about a normal that is perpendicular to the surface of the diffractive element (the azimuth $\phi$ in a polar coordinate system in which the surface normal forms the z-axis). It is additionally possible to determine, from the aspect ratio of the image of the diffractive element on the basis of the projection into the image plane, the polar angle (the elevation $\vartheta$) relative to the normal. It is additionally possible on the basis of the size and location of the image in the image field of the image recording apparatus and from the image distortion, with known imaging properties such as focal length and sensor size, to deduce in a known manner the distance and the lateral position of the image recording apparatus relative to the diffractive element.

The situation is similar if the diffractive element is provided with a plurality of suitable markings, which are arranged for example at known distances and angular relationships with respect to one another such that they are distributed across a surface in the region of the diffractive element. In this case, the form and size of the diffractive element do not matter.

If the orientation of the portable device relative to the diffractive element is determined directly from the recorded images, orientation sensors in the portable device can be omitted. However, since many portable devices, in particular most of today's smartphones, are already equipped ex works with such sensors, it is advantageous to likewise use the corresponding information in the method according to the invention. It is thus possible for example to improve the accuracy of the determination of the orientation and/or to provide redundancy by determining the orientation independently in two different ways.

The diffractive element can be applied on documents or other objects for example in the form of a label, a sticker, a print and the like, or can be introduced into objects as engraving, embossing, injection molding or by lithographic methods or erosion methods. Surfaces which are formed in such ways usually exhibit, upon viewing with the naked eye under illumination with white light, a rainbow-like image, which in the simplest case changes color under different viewing and irradiation angles. More complex forms show movements of patterns, symbols, or characters etc., which are dependent on the irradiation angle, up to apparently three-dimensional image objects and projections which are only completely visible under directional coherent light. The diffractive element can thus be selected such that, upon viewing from different orientations under illumination with white light, it creates at least one of the following effects:

a color shift;

a change or apparent movement of images, symbols or characters (this also includes movement parallax effects, i.e. the change of an image which usually occurs under viewing of a three-dimensional object from different spatial directions); and appearance and disappearance of images (including geometric shapes, pictograms or microstructures such as micro lettering), symbols or characters.

The method can comprise targeted user prompting. For example, the method can comprise in particular outputting instructions to the user via a visual or acoustic interface (for example a display and/or loudspeaker). By way of example, the instructions could correspond to the following: "1. Hold the device horizontally at a distance of 20-30 cm above the diffractive element; 2. Trigger the camera to record a first image; 3. Tilt the device by at least 20° about a first axis; 4. Trigger the camera to record a second image; 5. Tilt the device by at least 20° about a second axis; 6. Trigger the camera to record a third image; 7. Wait . . . Evaluating . . . ; 8. Result: the origin of the diffractive element is XYZ. Authenticity is confirmed." Completely different instructions are of course also conceivable. The instructions preferably depend on the determined spatial orientations and further measurement conditions to prompt the user in a more targeted fashion (for example "Tilt more slowly," "Now tilt about a different axis," "More illumination" etc.).

The comparison of the images and the associated spatial orientations with reference data can be done completely or partially in the portable device. To this end, the reference data can be storable in the portable device. The reference data can be stored statically in the portable device, for example in a local database which is set up in the portable device during installation of the respective program, or they can be retrieved dynamically during the performance of the method or during a synchronization procedure from a remote server with a corresponding database, for example via a wireless data link and/or a network. It is conceivable for example that the portable device is connected to the Internet via a WLAN or 2G/3G/4G mobile radio link or a short-range connection such as an infrared connection, a Bluetooth connection, an NFC connection etc., and that the remote server is likewise connected to the Internet such that the portable device can retrieve the data via a wireless connection and Internet from any desired location.

However, it is also conceivable that the comparison of the recording data with reference data is carried out entirely or partially in a separate evaluation unit which is spatially remote from the portable device. To this end, the recording data is transmitted to the evaluation unit. This can be done via a wireless data link and/or a network, as was already explained above. The transmitted recording data can, of course, also be processed further in the evaluation unit before the comparison.

To facilitate the evaluation, the portable device can send a device signature that is specific to the portable device to the evaluation unit. It is thus possible for device-specific characteristics such as the properties of the included optics and the included recording chip to be taken into consideration during the evaluation. In order to facilitate subsequent examinations or a quality check, the device signature can be stored together with the recording data in an electronic database. The recording data can also be linked with other data, such as date, time of day, user profile data etc.

Independently of the location where the recording data is compared to the reference data, it is advantageous if the authentication result is transmitted to an evaluation unit or to a server and/or to an electronic database. It is possible in this way to generate statistics relating to failed authentication attempts, so that forgeries of the diffractive element can be recognized better and traced. The authentication result can be stored together with the recording data and, if appropriate, with further data such as the device signature in the electronic database. It is possible in this manner to carry out a more accurate analysis of the recording data off-line and/or to train the image comparison algorithms at a later point by way of real data and to determine whether an improved recognition accuracy is achieved for a modified image comparison algorithm. For this purpose, or for other purposes, the recording data, the reference data, the authentication result and further data, such as the device signature, can be transmitted at least partially to other evaluation units.

The image recording apparatus preferably has an electrically controllable focusing device (for example in an autofocus apparatus that is known per se), and the image recording apparatus is operated such that it records images in different focal planes relative to the diffractive element. In this way, the plane having the greatest image sharpness can also be subsequently determined, or images in multiple focal planes can be used for the comparison with the reference data.

The focusing device can additionally provide data for estimating the quality of authentication. For example, a focus determination on the basis of an edge contrast measurement consists of measuring the steepness between light/dark contour edges, wherein a small value for a steepness indicates a poor sharpness and thus represents a poor quality of the image recording. A focus determination on the basis of a phase comparison measurement gives across the distance of identical light intensity patterns likewise quality parameters for the image sharpness and thus the quality of the image recording.

Furthermore, an integrated zoom function in the device is advantageous, wherein a digital zoom can be supplemented by an optical zoom. A zoom having a relatively long focal length is useful for example in the recognition of microstructures such as micro lettering. The function of the optical zoom is already available today in high-quality smartphones. Also available already are high-quality digital cameras which are operated on operating systems such as Android™ and allow camera-internal evaluation or wireless data communication similar to a smartphone. A camera with optical zoom can also be connected as an expansion module to the portable device, or the portable device can be equipped with a separate plug-on optic to achieve the necessary focal length or to increase the magnification in another way.

The portable device can have a geo-localization module for determining a location information, for example a GPS module. In this case, the authentication result can be associated (linked) with a location information. Such data can be used, for example, to estimate the regional frequency distribution of forgeries.

The portable device can have integrated sensors from whose measurement values a measure of quality for the authentication is determined. To this end, the already mentioned inertial sensors (linear acceleration sensors) and gyroscopes (rotary acceleration sensors), among others, can be used, wherein the measure of quality is then determined from the acceleration data of said sensors. This can be used for example to detect undesired jerky movements. The portable device can optionally interrupt the measurement if the measure of quality is outside a prespecified value range, and/or can indicate the lack of measurement quality to the user in a suitable form, for example can output an error message.

The invention furthermore provides a portable device for authenticating a diffractive element. The portable device comprises:

an image recording apparatus;

a memory device in which a program for carrying out a method is stored, the method comprising:

recording of at least two images of the diffractive element using a portable device having an image recording apparatus, wherein the images are recorded with different spatial orientations of the portable device relative to the diffractive element;

determining the spatial orientations of the portable device relative to the diffractive element during the recording of the images with respect to at least two spatial directions;

generating recording data from the images and the associated spatial orientations; and electronically comparing the recording data with reference data; and at least one processor for carrying out the program.

As already mentioned, the portable device preferably also has sensors for determining an orientation of the portable device with respect to at least two spatial directions.

In order to facilitate the illumination, the portable device can have a light source, such as for example one or more LEDs, a UV-LED (for example for detecting luminescence), or a laser, for example in the form of a laser diode (for example for detecting a CLR effect (CLR=covert laser readable)). Such luminous means can be fixedly installed or can supplement the portable device in the form of separate illumination modules, for example as a plug-on module. The diffractive element is illuminated during the recording of the images preferably with such a light source. Since the light source is arranged in a positionally fixed manner on the portable device, not only the spatial orientation between the image recording apparatus and the diffractive element changes from recording to recording, but also the orientation between the light source and the diffractive element. This, together with the knowledge of the illumination direction, can facilitate the evaluation. As was already explained above, the portable device can additionally be provided with a separate magnification module with a lens arrangement made up of at least one lens so as to increase the magnification of the image recording device. Illumination and magnification can be also realized by way of an additional module in the form of a combined illumination and magnification module.

Accordingly, the invention relates also to a set composed of a portable device of the previously mentioned type and a separate additional module, wherein the additional module is connectable to the portable device and comprises at least one of the following elements:

a lens arrangement made up of at least one lens for increasing the magnification of the image recording apparatus; and/or a light source for illuminating the diffractive element, wherein the light source can be in particular a laser.

The invention also relates to such an additional module by itself.

As was already explained above, the portable device can be configured to communicate with a spatially remote device (server, evaluation unit). To this end, the portable device can have at least one communication module for data exchange via a network. This can be a wireless communication module, for example a mobile radio module according to a known mobile radio standard such as GSM/CPRS/EDGE (2G), UMTS (3G) or LTE (4G), a WLAN/Wi-Fi module, a Bluetooth module, a near field communication module (NFC module) etc.

The portable device can be one of the following devices: a mobile telephone (in particular what is referred to as a smartphone), a portable computer such as a tablet computer or a notebook computer, a PDA ("personal digital assistant"), an electronic reading device such as an e-book reader, a scanner, a digital photo camera, a digital video camera, a digital music player, a portable digital video player, a portable games console, a watch, a computer peripheral device.

The invention additionally makes available a computer program which executes a method of the previously illustrated type during the execution in a portable device that has an image recording apparatus. It is thus provided a computer program element which contains a computer program code that executes the method during execution in a control device of a portable device. The computer program or computer program element can be provided in any suitable form, including source code, object code or machine code. It can be stored on a computer readable medium or be made available as a data stream via a network. The computer program can be what is known as an "app," which communicates on an existing operating system with the hardware of the portable device via defined APIs.

All considerations relating to the method of the present invention analogously apply to the portable device and the computer program of the present invention.

BRIEF DESCRIPTION OF THE DRAWINGS

Preferred embodiments of the invention will be described below with reference to drawings which serve only for illustration and are not to be interpreted in a limiting manner. In the drawings.

WAYS FOR CARRYING OUT THE INVENTION

Figure 1:
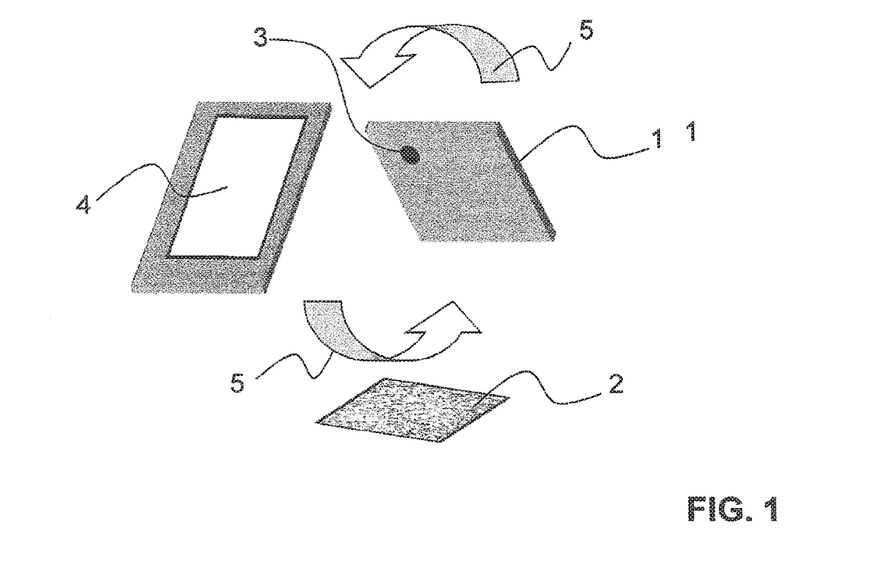
FIG. 1 shows a sketch for illustrating the method according to the invention during rotation about a first axis.
Figure 2:
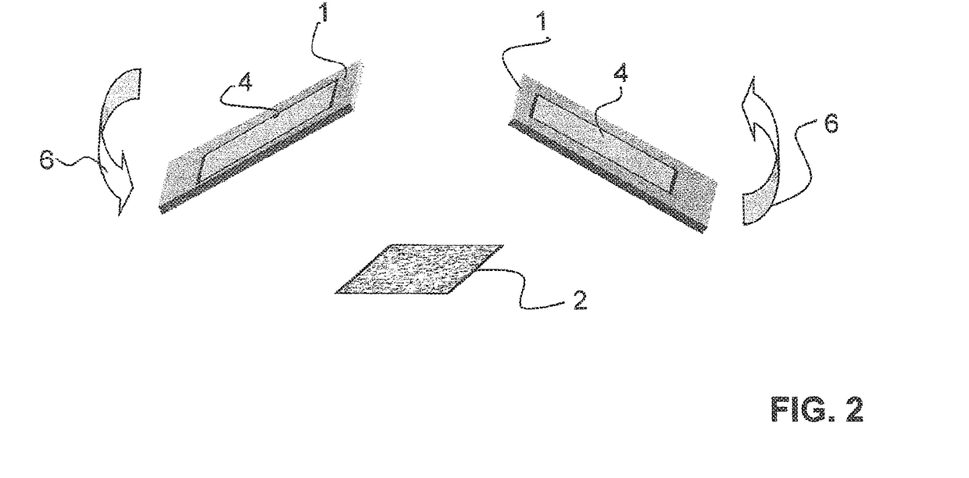
FIG. 2 shows a sketch for illustrating the method according to the invention during rotation about a second axis.
Figure 3:
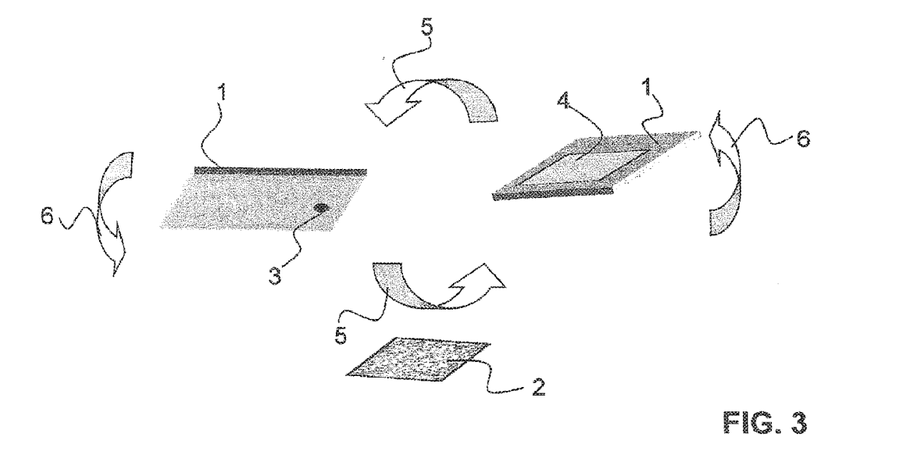
FIG. 3 shows a sketch for illustrating the method according to the invention during rotation both about the first and the second axis.

FIGS. 1-3 illustrate a portable device 1 in the form of a smartphone having an image recording apparatus in the form of a camera 3 and a display 4. The portable device 1 is used to authenticate an optically diffractive element on a document 2. To this end, the portable device 1 is tilted about a first or second spatial axis relative to the diffractive element (arrows 5, 6). The images of the diffractive element are recorded here from different spatial directions. Recording data is derived from the images and the associated orientations of the portable device 1 and compared electronically to reference data in order to authenticate the diffractive element.

In principle, authentication on the basis of such recording data is conceivable even if at least one image and one first correlated value for the orientation between device 1 and document 2 are available. This simplest of cases of a verification can be, for example, the examination of a holographic brand logo by a consumer to strengthen the faith in the originality of an article he wishes to buy. In this case, the consumer receives the app that is necessary for verification for example from the website of the brand proprietor.

For a more reliable authentication, for example for customs authorities, the minimal variant is, however, usually not sufficient. It is therefore advantageous to carry out at least a second image recording at another orientation in order to obtain more meaningful recording data. In principle, any desired number of partial information items can be contained in a diffractive structure such as a hologram, with different partial information items being observable from different spatial directions. For example, an object shown in a hologram or kinegram can appear to move as the image recording angle gradually changes, or have repeatedly new aspects. With each image recording in the case of such a multi-image verification, a further value pair composed of image information and spatial orientation is generated, which statistically increases the reliability of the authentication according to the invention considerably.

Furthermore, the described method includes the possibility of increasing the complexity and thus the degree of anti-forgery security by linking the image information not only with the spatial orientation, but also with further spatial parameters. One example of a further spatial parameter is the adjusted focal plane of the image recording apparatus. Since a hologram forms an apparent spatial depth, in each case one other image information item with different focal planes reveals itself. In this example, the portable device generates with each image recording quasi a value triplet consisting of image information, orientation and focal plane. In principle, it is conceivable to further increase the complexity of the authentication by adding further values to the image information.

Image acquisition can take place with a video function of the portable device 1, which is typically already available in today's smartphones.

The recording data can include any information that stems from the image recordings. The recording data can in particular include the original image files. The original image files, however, have the disadvantage that the file size and correspondingly the memory space that is required are great. Furthermore, the computational complexity for authentication is high on account of the large amount of data, which requires compromises in terms of the computational power—on the portable device or a remote server—and the verification speed. The recording data therefore preferably comprise data that is extracted from the image recording, for example vector data of extracted alphanumerical characters, logos, ornaments etc. The data is here extracted with typical image processing and image recognition algorithms according to the prior art. The extracted data can also be hash variables which are derived from properties such as for example the random micro-structure defects of the diffractive structure.

During the authentication procedure, the portable device can be connected online to a server, or—which is more advantageous in practical terms—it can perform the authentication off-line. The data sets of the examined diffractive structures are in this case uploaded the next time connection to the server is established to complete the authentications. In a further variant, the reference data are already stored in a memory of the mobile telephone such that in this variant, the authentication can be completed immediately without server contact.

The verification results can be expanded with the identity of the verifier or other profile data and the location of the verification, since the devices themselves usually identify themselves with a UUID (universally unique identifier) and typically have a GPS receiver. Further advantages can be found in the obligatory logging of the verification time by way of the clock of the device and the use of the integrated acceleration sensors, the gyroscopes, the autofocus measurement and the exposure measurement for a quality value for the respective verification procedure.

The image acquisition should, if possible, be carried out with a steady hand, wherein suitable light conditions and sufficient object focusing must be present. Verification with jittery hand movements generally causes less reliable results than those which are carried out with a steady hand movement. Similarly, verification carried out in the dark or with lack of sharp adjustment gives a less reliable or even unusable result as compared to a verification which is based on image recordings with optimum exposure and sharpness. It is therefore advantageous to acquire such parameters during the recording and to incorporate them in a quality assessment. The portable device can calculate one or more quality indicators from such parameters and emit a warning signal and/or interrupt the measurement if one or more quality indicators are outside a prespecified value range.

The method is carried out in the portable device advantageously by way of a software which guides the user through the procedure, carries out the evaluation and prepares data sets for upload to a server. Updated versions of the software, if available, are downloaded the next time contact is made with the server. The device software should therefore have a protocol which allows connection to a remote server.

In a simplified version of the method, however, communication with the server can also be dispensed with.

Figure 4:
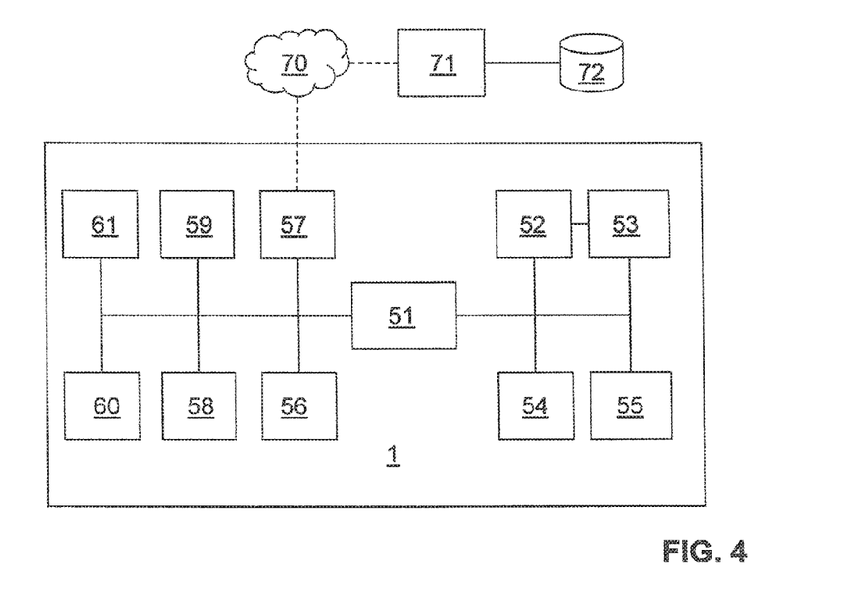
FIG. 4 shows a schematic sketch of selected components of a mobile telephone which are used in a method according to the invention.

FIG. 4 illustrates in a very schematic manner some relevant components of a system for carrying out the method. A portable device 1 has, among others, a processor 51 that controls the method. The following act together with the processor 51, among others: an image recording device (camera) 52 having an autofocus device 53; an illumination device 54 (for example an LED flash); a touch screen display 55; a memory 56; a communication module 57 (for example mobile radio module, Bluetooth module, NFC module etc.); an inertial sensor unit 58 having inertial sensors for three orthogonal spatial directions; a gyroscope unit 59 having rotary angle acceleration sensors (gyroscopes) with respect to rotations about three orthogonal spatial directions; a geo-localization module 60 (for example a GPS module); a loudspeaker 61. The portable device can contain further input/output devices such as, for example, a keyboard and further sensors that similarly cooperate with the processor 51, for example sensors for ambient light, temperature, humidity etc. A remote evaluation unit 71 (server) communicates wirelessly with the communication module 57 via a network 70. A database 72 is connected to the evaluation unit 72.

Figure 5:
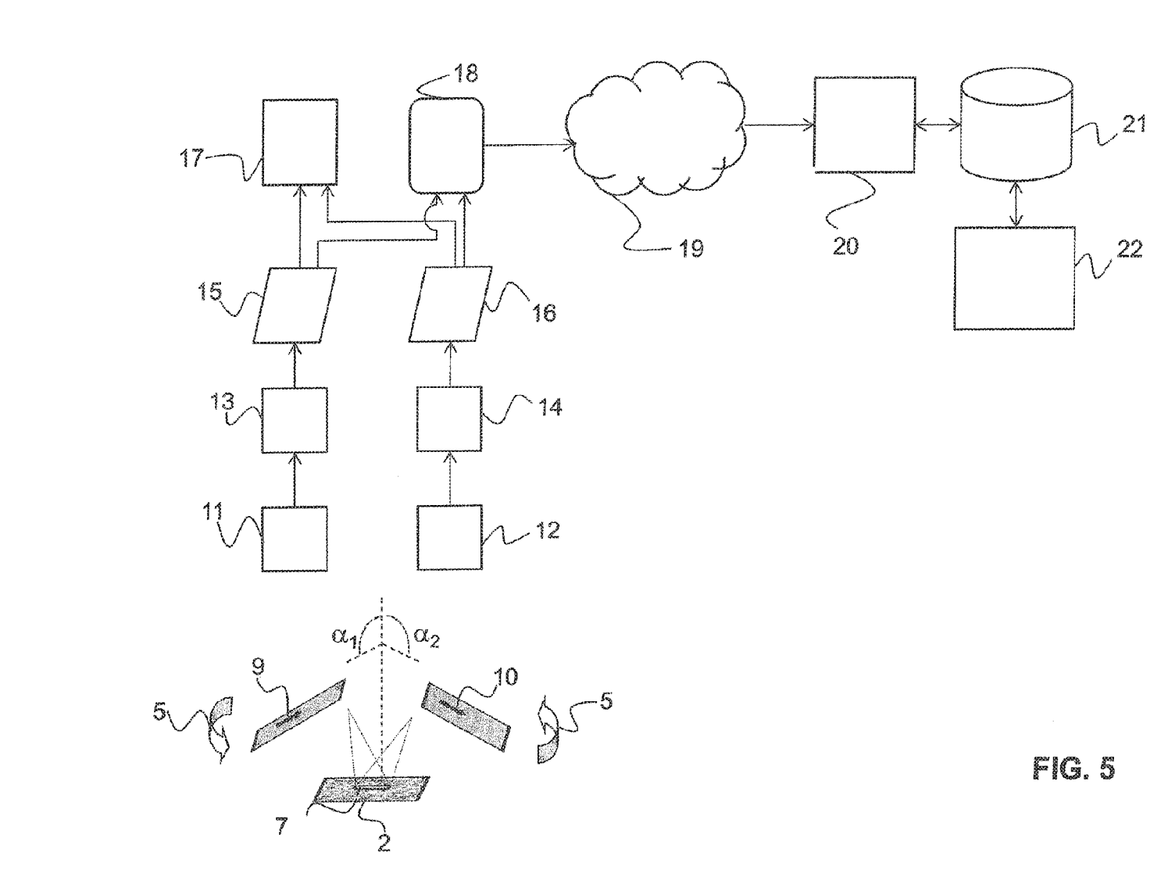
FIG. 5 shows a flow chart for an embodiment of the invention.

FIG. 5 is now used to explain a few operating modes of the portable device used for authentication. The procedure can take place in principle as follows: a diffractive element 7 on a document 2 is recorded from at least two orientations, which are, for purposes of summary and simplification, indicated here with angular references $\alpha_1$, $\alpha_2$, with a portable device (carrying out the first image recording 11; carrying out the second image recording 12). The images of the diffractive element are optionally displayed on a display of the portable device as images 9 and 10. The first and second image recordings are reduced in steps 13 and 14 to a first and second image information item. This data reduction is advantageous for efficiently processing data and storing data. In a simple case, recognizable letters and numbers are produced, from the image of the diffractive element, as vector files, for example in the format .cgm, .dxf, .odg or .svg, with typical image processing routines. In steps 15 and 16, a first and second image recording data set is produced from the image information together with the orientation data. The data sets are compared in the portable device with reference data (step 17) and/or sent to a network (step 18), whereupon they are transmitted from the network to an external server (step 19). The external server receives the data sets in step 20, compares them in step 21 with data from a database, and subsequently evaluates the data sets, for example for quality control purposes, for statistical recording etc.

During the comparison with reference data, image elements contained in the images can be examined, such as for the presence of specific shapes, lines, graphic characters, numbers, codes etc. These image elements can be embedded in the diffractive element (in the form of diffractive structures such that they change their appearance, for example, in dependence on the observation direction) and/or be superposed on the diffractive element, for example as a print next to the diffractive element. Recognition methods can also be used here, as are described in WO 2012/032367 A1. Displaced edge regions in correspondingly prepared markings are recognized in such methods.

The following operating modes should be discussed in particular:

(a) Authentication without any server connection: in this fully autonomous mode, at least two images are recorded for the authentication of a diffractive element 7 on a surface of an object or document 2 with orientations $\alpha_1$, $\alpha_2$ of the portable device relative to the document 2. The user is here guided by the software through the procedure, wherein the software acts as an operating guide, as it were. The first instruction by the software can for example be to give a specific recording angle to carry out a first image recording 11 and a second image recording 12. In the autonomous mode, the storing of the image and orientation information and optionally of the information regarding angular change velocity, linear acceleration and GPS coordinates and their evaluation is carried out preferably automatically. In this mode, optionally a protocol of all captured data, including the ID of the user, and about the result of the authentication consisting of yes/no information and a quality value can be stored and, if appropriate, be displayed automatically or upon request by the user. This operating mode is of value primarily for consumers. The software necessary for operation is made available for this application case as an app, for example on the website of a manufacturer or brand owner.

(b) Authentication with occasional server connection: the workflow generally contains the same elements as in the exclusively autonomous operating mode. In addition, data is synchronized once a connection to the server 20 is established, wherein one or more of the following actions are carried out: (i) an updated authentication program is downloaded from the server 20, provided a new version of the program is available. (ii) The authentication result is uploaded together with all other data of the protocol to the server 20. (iii) The uploaded data is stored on the central database 21 and prepared by the server 20 in a desired form, for example as a report for the brand owner. The value of the prepared data can serve not only purely security-related aspects but also marketing purposes and is therefore to be considered very valuable for users, such as for example for the manufacturer of the product which is provided with the relevant genuineness feature. (iv) The prepared data is made available to the user carrying out the authentication in situ by way of a download. This option (iv) can, for reasons of confidentiality, also be suppressed.

The operating mode including the occasional server connection in practice has the greatest meaning since in this mode, the central storage and evaluation of data necessary for professional authentication is available, but an expensive connection that is prone to interference does not need to be permanently established during the authentication.

(c) Authentication with permanent server connection: in this completely non-autonomous operating mode, the application program located on the smartphone covers only those functions that allow the data recording consisting of image data and at least the associated orientation values and the upload of the data to the server. Logging of the data recording and evaluation of the data is carried out on the remote server. In this mode, the user is preferably notified only of the completion and the result of the authentication. The information for the user can in this operating mode be for example: "Authentication successful, feature genuine." The completely non-autonomous operating mode has, as compared to the partially autonomous mode with occasional server connection, only the advantage that no sensitive protocol data is stored on the smartphone.

For various reasons there exists a great need for these types of genuineness verification. Not only the buyer or person renting the product or the owner of the document has access to the relatively quickly obtained assurance to have a genuine document or product, but also industrial manufacturers of a valuable pre-product, for example an installation part for a machine, or for example also the business that sells the products under protection, service providers that use such products, or even authorities that must examine products, such as customs authorities, or must check documents, such as border authorities.

Not only is a large number of groups of people interested in these verification results, the associated data also permits further statistical recording in step 22, for example for marketing purposes or to establish a payment system for the verification procedures.

Figure 6:
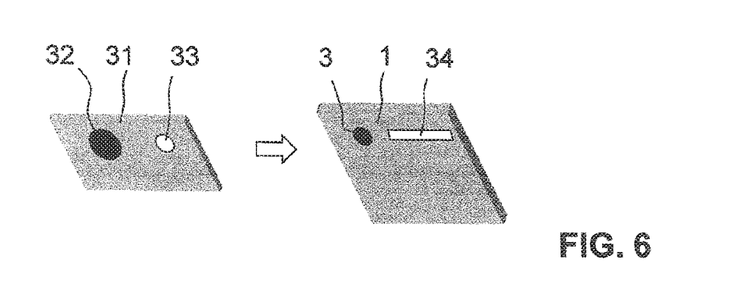
FIG. 6 shows a smartphone with an external magnification and illumination module.

FIG. 6 illustrates a portable device 1 having a separate additional module 31. The additional module has a lens arrangement 32 in order to increase the magnification of the camera 3 that is installed in the portable device and to thus be able to resolve finer details of a diffractive structure. The additional module additionally has a special light source 33, for example a (diode) laser or a special LED in order to illuminate the diffractive element in a targeted fashion. Said light source replaces the installed flash 34 of the portable device. The additional module can be plugged onto the portable device. To this end, it has guideways which are not shown in the illustration, as are known to the person skilled in the art. The additional module can be connectable wirelessly to the portable device, for example via an NFC interface or Bluetooth. In this case, it has a dedicated energy source, for example a rechargeable battery. However, the additional module can also be connectable to the portable device via a plug connection which is not shown in the illustration.

Figure 7:
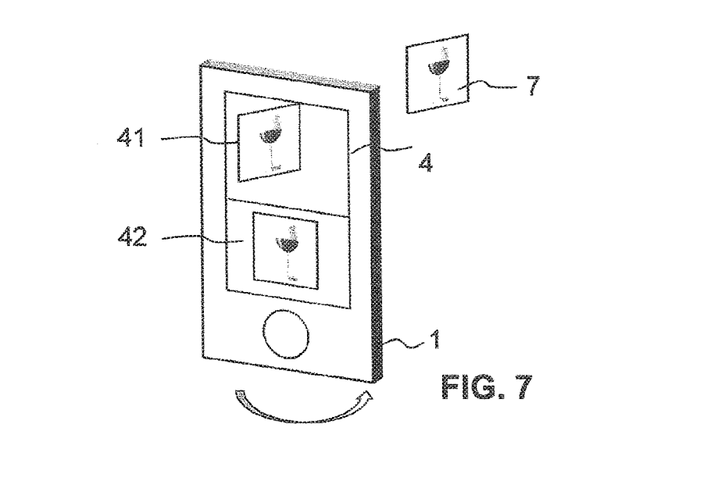
FIG. 7 shows a sketch for illustrating a possible variant of user prompting.

FIG. 7 schematically illustrates one possible variant of the user prompting. The display 4 of the portable device 1 is here split into two regions 41, 42. In the top region 41, the image of the diffractive element 7 recorded by the camera is illustrated. The bottom region 42 illustrates a prespecified first reference image. The user is now prompted to align the portable device such that the image recorded by the camera corresponds as closely as possible to the first reference image. The image thus recorded is incorporated in the evaluation. Next, the bottom region 42 illustrates a different aspect of the diffractive element from a different spatial direction. Once again the user is now guided such that he aligns the portable device accordingly, such that the image recorded by the camera in the top region 41 corresponds as closely as possible to the second reference image. This procedure is repeated further, as appropriate. The images thus recorded are then used to carry out a comparison with reference data.

In order to "train" the portable device, the user can be prompted such that he makes recordings of a prespecified diffractive element under different environmental conditions (for example sunshine, rain, interior etc.) using the portable device. In this way, the robustness of the method can be improved.

The invention claimed is:

1. A method for authenticating a diffractive element, comprising:
   recording of at least two images of the diffractive element using a portable device having an image recording apparatus, wherein the images are recorded with different spatial orientations of the portable device relative to the diffractive element;
   determining the spatial orientations of the portable device relative to the diffractive element during the recording of the images with respect to at least two spatial directions;
   generating recording data from the images and the associated spatial orientations; and electronically comparing the recording data with reference data in order to authenticate the diffractive element.

2. The method as claimed in claim 1, wherein the spatial orientations of the portable device relative to the diffractive element are determined by way of sensors that are integrated in the portable device.

3. The method as claimed in claim 1, wherein the spatial orientations of the portable device relative to the diffractive element are determined by way of analysis of the recorded images.

4. The method as claimed in claim 1, which additionally comprises:
   outputting instructions to the user via a visual or acoustic interface.

5. The method as claimed in claim 1, wherein reference data are stored in the portable device and the electronic comparison of the recording data with reference data is carried out at least partially in the portable device.

6. The method as claimed in claim 1, which comprises:
   transmitting the recording data to an evaluation unit that is spatially remote from the portable device,
   wherein the electronic comparison of the recording data with reference data takes place in the evaluation unit.

7. The method as claimed in claim 6, wherein the portable device sends a device signature that is specific to the portable device to the evaluation unit.

8. The method as claimed in claim 7, wherein the device signature is stored together with the recording data in an electronic database.

9. The method as claimed in claim 1, wherein an authentication result is transmitted to an electronic database and stored in the electronic database.

10. The method as claimed in claim 1, wherein the image recording apparatus comprises an electrically controllable focusing device, and wherein the image recording apparatus is operated such that it records images in different focal planes relative to the diffractive element.

11. The method as claimed in claim 1, wherein the portable device comprises a geo-localization module for determining a location information, and wherein an authentication result is associated with a location information.

12. The method as claimed in claim 1, wherein a measure of quality for the authentication is determined from data from one or more sensors integrated in the portable device.

13. The method as claimed in claim 12, wherein the sensors comprise at least one of a linear acceleration sensor and a rotary acceleration sensor, and wherein the measure of quality is determined from acceleration data of said acceleration sensors.

14. The method as claimed in claim 12, wherein an error message is output if the measure of quality is outside a prespecified value range.

15. The method as claimed in claim 1, wherein at least two images are recorded under different illumination conditions.

16. The method as claimed in claim 15, wherein at least one image is recorded under ambient light and a further image is recorded under illumination with a light source that is integrated in the portable device or is connected to the portable device.

17. The method as claimed in claim 15, wherein at least two images are recorded at different illumination intensities of a light source that is integrated in the portable device or connected to the portable device.

18. A portable device for authenticating a diffractive element, comprising:
   an image recording apparatus;
   a memory device, in which a program for carrying out a method is stored; and
   at least one processor for carrying out the program, wherein the method comprises:
recording of at least two images of the diffractive element using the portable device, wherein the images are recorded with different spatial orientations of the portable device relative to the diffractive element;
determining the spatial orientations of the portable device relative to the diffractive element during the recording of the images with respect to at least two spatial directions;
generating recording data from the images and the associated spatial orientations; and
electronically comparing the recording data with reference data in order to authenticate the diffractive element.

19. The portable device as claimed in claim 18, which additionally comprises sensors for determining an orientation of the portable device with respect to at least two spatial directions.

20. The portable device as claimed in claim 18, wherein the portable device is one of the following devices: a mobile telephone, a portable computer such as a tablet computer or a notebook computer, a PDA, an electronic reading device such as an e-book reader, a scanner, a digital photo camera, a digital video camera, a display device, a digital music player, a portable digital video player, a portable games console, a watch, a computer peripheral device.

21. A kit comprising a portable device and a separate optical module, wherein the portable device comprises:
an image recording apparatus;
a memory device, in which a program for carrying out a method is stored, the method comprising:
recording of at least two images of the diffractive element using the portable device, wherein the images are recorded with different spatial orientations of the portable device relative to the diffractive element;
determining the spatial orientations of the portable device relative to the diffractive element during the recording of the images with respect to at least two spatial directions;
generating recording data from the images and the associated spatial orientations; and
electronically comparing the recording data with reference data in order to authenticate the diffractive element; and
at least one processor for carrying out the program, and
wherein the optical module is connectable to the portable device and comprises at least one of the following elements:
a lens arrangement made up of at least one lens for increasing the magnification of the image recording apparatus;
a light source for illuminating the diffractive element.

22. The kit as claimed in claim 21, wherein the light source is a laser.

23. An optical module for a portable device, wherein the portable device comprises:
an image recording apparatus;
a memory device, in which a program for carrying out a method is stored, the method comprising:
recording of at least two images of the diffractive element using the portable device, wherein the images are recorded with different spatial orientations of the portable device relative to the diffractive element;
determining the spatial orientations of the portable device relative to the diffractive element during the recording of the images with respect to at least two spatial directions;
generating recording data from the images and the associated spatial orientations; and
electronically comparing the recording data with reference data in order to authenticate the diffractive element; and
at least one processor for carrying out the program, and
wherein the optical module is connectable to the portable device and comprises at least one of the following elements:
a lens arrangement made up of at least one lens for increasing the magnification of an image recording apparatus of the portable device; and
a light source for illuminating the diffractive element.

24. The optical module as claimed in claim 23, wherein the light source is a laser.

25. A non-transitory computer readable medium storing a computer program for carrying out a method during the performance in a portable device, the method comprising:
recording of at least two images of the diffractive element using the portable device having an image recording apparatus, wherein the images are recorded with different spatial orientations of the portable device relative to the diffractive element;
determining the spatial orientations of the portable device relative to the diffractive element during the recording of the images with respect to at least two spatial directions;
generating recording data from the images and the associated spatial orientations; and
electronically comparing the recording data with reference data in order to authenticate the diffractive element.

26. The method as claimed in claim 4, wherein the instructions to the user are outputted via the visual or acoustic interface in dependence on the determined spatial orientations.

27. The method as claimed in claim 9, wherein the authentication result is transmitted to the electronic database and stored in the electronic database together with the recording data.

* * * * *